United States Patent Office 3,042,855
Patented July 3, 1962

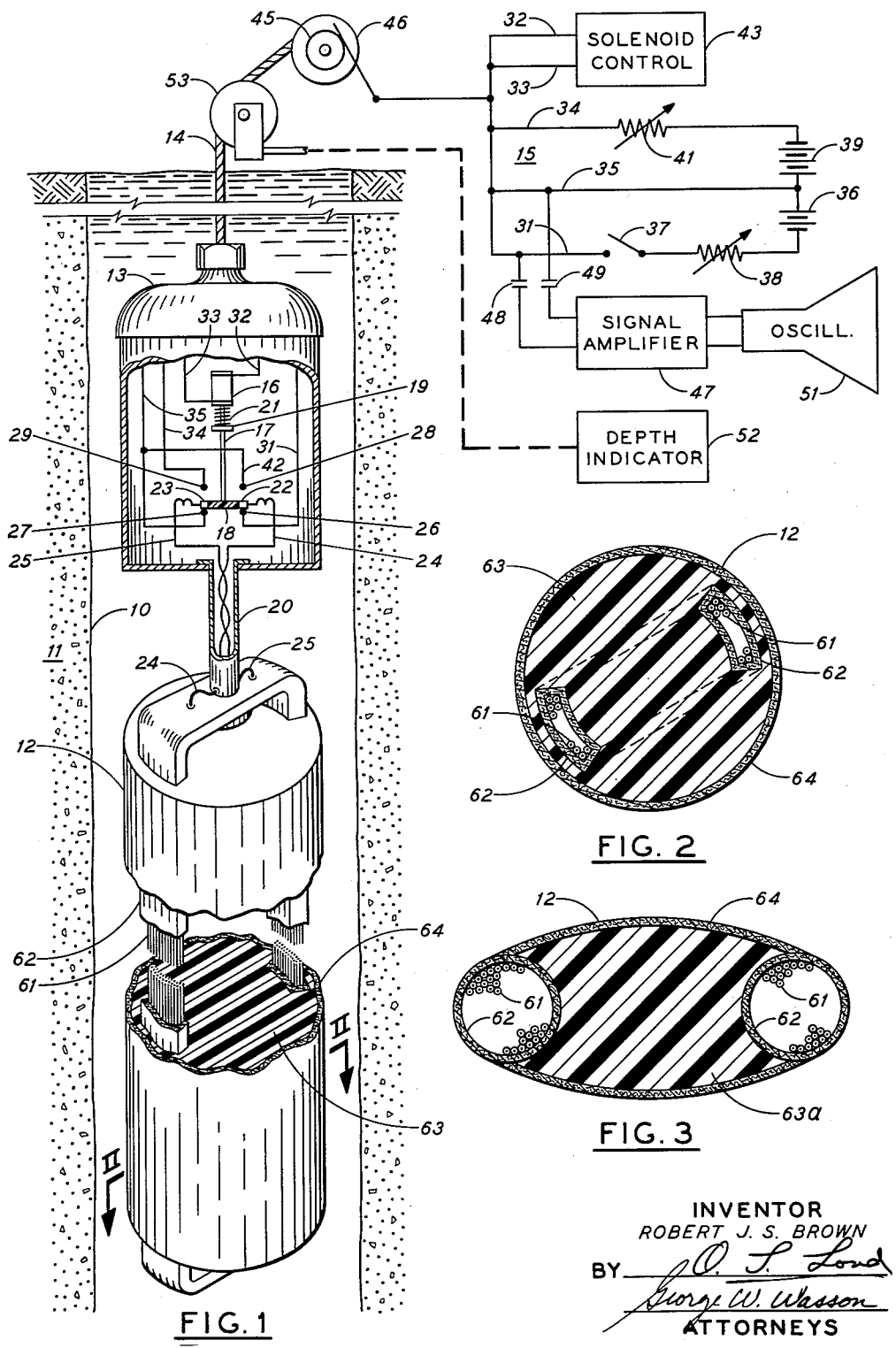

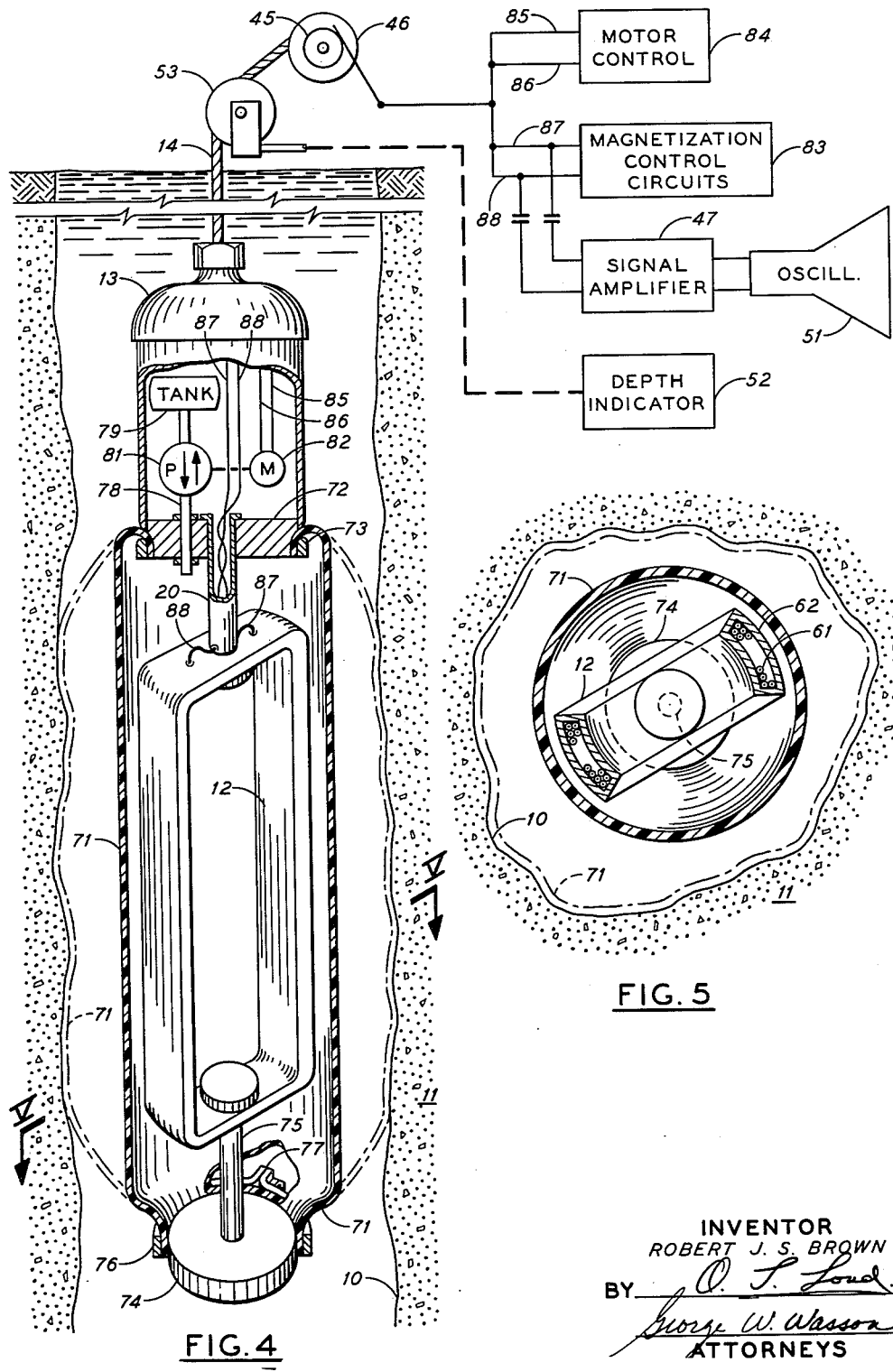

3,042,855
METHOD OF AND APPARATUS FOR REDUCING REMNANT MAGNETIC FIELDS IN NUCLEAR MAGNETISM WELL LOGGING
Robert J. S. Brown, Fullerton, Calif., assignor to California Research Corporation, San Francisco, Calif., a corporation of Delaware
Filed Nov. 22, 1957, Ser. No. 698,142
2 Claims. (Cl. 324—.5)

This invention relates to nuclear magnetism well logging and more particularly to a method and apparatus for reducing magnetic field inhomogeneities in the precession field employed for deriving spin magnetic induction signals from the precession of polarized atomic particles having spin magnetic moments and located in the earth formation traversed by the well bore where said signals are used to identify a characteristic of the earth formation, such as the liquids therein.

The prior art includes applications of the physical principles involved in the existence and detection of spin magnetic induction signals. Also included in the prior art are disclosures of the application of this phenomenon to the art of well logging. The phenomenon being observed has an explainable analogy by comparison to the action of a gyroscope when subjected to a force tending to tip its axis of rotation. The analogy to a gyroscope becomes strained when compared to the action of a single atom or the proton of an atom in that many forces and effects are acting upon the atom in its association with other atoms. In actuality, precession is a quantum mechanical process that can be described in terms of probabilities or expectation values and, in this respect, a statistically significant group of atoms or protons can be considered as a classical precessing and magnetized gyroscope.

In the techniques employed in well logging, atomic particles of an earth formation traversed by a well bore are polarized in a magnetic field generated by current flow through a coiled electrical conductor. After the polarization field has been removed, and after any subsequent relaxation field has been removed, it is desirable that the protons aligned by the polarization and relaxation fields be subjected to a precession field that is, ideally, spatially uniform. By spatially uniform is meant that the precession field in the earth formation containing the protons contributing to the spin magnetic induction signals will be uniform in strength and be parallel in the vicinity of the detector employed to receive the signals. The uniformity of this field is important to the measurement of spin magnetic induction signals because of the relationship of frequency of precession and precession field strength wherein the frequency of precession of a polarized proton is proportional to the strength of the field in which it is precessing. If the precession field is nonuniform, the rate of precession for all protons within the group will not be the same throughout the earth formation being logged, and if the rate of precession is different for certain of the protons, then the protons within the group will soon get out of phase with each other and become so randomly out of phase in their precession that there will be no cumulative signal as there would be if all protons were precessing at the same rate with individual signals reinforcing each other in the detector to produce a signal of observable strength. Summarizing the foregoing then, if the precession field is nonuniform, the spin magnetic induction signal will be weakened and may even be canceled.

As is particularly explained in the co-pending application of R. J. S. Brown, Serial No. 698,108, filed November 22, 1957, and titled "Method and Means for Reducing Inhomogeneities in Nuclear Magnetism Well Logging," now Patent No. 2,999,204, issued September 5, 1961, the nonuniformity in the precession field employed in the spin magnetic induction logging art is derived from the spatial nonuniformity of the flux pattern of a field produced by an electromagnetic coil, and the effect of this field upon magnetizable materials within earth formation and drilling fluids. The just mentioned co-pending application is directed primarily to the effect of magnetizable materials within the formation and drilling fluids upon spin magnetic induction signals and to a method for eliminating these effects. In that application the magnetization of magnetizable material in the flux pattern of the field produced by a polarizing coil is considered along with its effect upon the well logging signal. This application is directed to the magnetization of the magnetizable materials in the drilling fluid within the core of the polarizing coil and its effect upon well logging signals.

Considering the pattern of the magnetic force lines produced by an electromagnetic coil, it should be apparent that the vector sum of the incremental contributions to the magnetic field outside the well bore by the magnetized drilling fluid within the well bore but outside the region occupied by the coil is zero. That is, in the regions outside of the area occupied by the coil there is as much area with a field in any given direction as with a field in any other direction. As distinguished from the foregoing, the flux pattern of the field within the core of the coil will always be in one direction and, with proper placement of the windings for the coil, may be exactly uniform throughout the core.

As was explained in the aforementioned co-pending application, it is the magnetization of the magnetizable particles within the drilling fluid and earth formations by the polarizing field that produces the inhomogeneities in the precession field. Collectively, these inhomogeneities have a fanning pattern about the polarizing coil that may be considered as a plurality of incremental magnetic poles aligned in the fanning pattern. As distinguished from the incremental effects above, the magnetization of magnetizable materials within the core of the electromagnetic coil is substantially in a single direction and produces a persisting remnant field as from a single strong magnetic pole.

This remnant field continues after the polarization field has been terminated with a flux pattern similar to that produced by the polarizing coil fanning from the source and adding to the inhomogeneity of the field remaining in the formation after polarization. This remnant field adds to the inhomogeneity of the precession field through vectorial accumulation with the uniform earth's magnetic field so that the resultant precession field for polarized atomic particles will in some places be of lesser strength and in other places of greater strength than the earth's field alone. As a single objectionable component, the field retained by the magnetizable particles within the core of the polarizing coil is the most serious and, as will be herein seen, the most easily eliminated.

In the logging of an earth formation with spin magnetic induction techniques, it is impossible to avoid the effects of magnetizable materials within the formations; therefore, other techniques must be employed to improve the homogeneity of the precession field. These magntizable materials occur naturally within the earth formation being logged and are in the drilling fluid by being chipped or abrasively removed from the formation, the drill stem and drill bit as the well bore is penetrated through an earth formation. Furthermore, some of the materials from which drilling fluids are compounded are magnetizable, and in some cases it is desirable to intentionally add magnetizable materials to eliminate precession signals from the drilling fluid itself as fully explained in the co-pending applications. It is, on the other hand, possible to eliminate the effect of the magnetic field produced by the magnetized materials within the core of the polarizing coil, and through this elimination to improve the character of the spin magnetic induction signal developed in the well logging operation by improving the uniformity of the precession field.

The improvement of the precession field homogeneity is accomplished by excluding the drilling fluids from the core of the polarizing coil, thus eliminating magnetizable materials from the concentrated flux in the core of the coil. The improveemnt of the character of the spin magnetic induction signal is accomplished by constructing the core for the polarizing coil of a material giving no appreciable precession signal during a normal well logging tool operation. The core should be constructed of a material which is not appreciably magnetized by the polarizing field. This construction and operation improves the precession field and eliminates precession signals from the core.

The same construction of the core and a different operation of the tool will provide additional utility to the present invention. If selected particles having gyromagnetic characteristics are added to the core material, then precession signals could be derived from the core. If the selected particles require a substantially longer polarization period than would normally be required for polarization of the precession signal producing particles within the earth formation or drilling fluids, then normal operation of the well logging tool would be expected to produce precession signals only from the desired formation materials. On the other hand, if the tool were operated in a manner to produce polarization of the selected particles within the core, then core material precession signals and formation material precession signals would be expected.

The above feature adds a test facility as well as the precession field improvement accomplished by merely eliminating drilling fluids from the core of the coil. The tool's operation may now be tested when no precession signals are received during a normal tool operation. The absence of signals could mean tool failure or merely the absence of materials having the appropriate gyromagnetic characteristics. An immediate operation of the tool in a manner that would produce polarization of the selected particles within the core and the detection of the expected signals would eliminate tool failure from consideration. On the other hand, the absence of the expected signal would indicate a probable tool failure.

It should be understood that in well logging operations particularly in the search for petroleum in its crude form, it is the presence of the hydrogen atom that is to be determined. The method of this determination, as is explained in the aforementioned co-pending applications, is most easily accomplished by investigating the magnetic moment and the behavior of the nucleus of a hydrogen atom in a porous media when acted upon by controlled magnetic polarizing fields. Various nuclei found within an earth formation other than hydrogen have magnetic moments but give no spin magnetic induction signals in a logging operation because of the selected polarization period or because of other techniques employed in the operation of the logging tool. Furthermore, under some circumstances, no signals are derived from hydrogen because of the state of the chemical composition containing the hydrogen, e.g., hydrogen in a solid or very viscous fluid, or because of circumstances within the well bore or earth formation, e.g., in homogeneous fields or the presence of paramagnetic ions. Under the above circumstances, even if the thermal relaxation times for the atoms being investigated are very long, as is possible in solid matter, the transverse relaxation times, which limit signal duration, are too short.

It is, therefore, the object of the present invention to provide an improved spin magnetic induction well logging tool for the detection of spin magnetic induction signals derived from the atomic particles within an earth formation being logged.

A further object of the present invention is a means for improving spin magnetic induction well logging signals by providing a core of nonmagnetic material of selected chemical composition to have a desired atomic magnetic moment.

A further object of the present invention is the provision of a means in a spin magnetic induction well logging tool for excluding the drilling fluids from the volume of the well bore generally defined by the dimensions of the polarizing coil, and particularly from the volume defined by the core of the polarizing coil.

A further object of the present invention is a method for improving spin magnetic induction signals from atomic particles within an earth formation penetrated by a well bore.

Other objects and features of the invention will be readily apparent to those skilled in the art from the specification and appended drawings illustrating certain preferred embodiments in which:

FIG. 1 is a partially perspective schematic representation of a well logging tool adapted to carry out the method and illustrating the apparatus of the present invention.

FIG. 2 is a sectional view taken along the lines II—II of FIG. 1.

FIG. 3 is a sectional view of an alternative form of polarizing coil and core construction for the apparatus of the present invention.

FIG. 4 is a schematic representation of a well logging tool illustrating an alternative form of apparatus for carrying out the method of the present invention.

FIG. 5 is a sectional view taken along the lines V—V of FIG. 4.

FIG. 1 illustrates one form of apparatus for performing spin magnetic induction well logging operations within an earth formation penetrated by a well bore. As shown in this figure, the spin magnetic induction well logging measurements are made on a portion of the earth formation lying along a well bore 10 traversing an earth formation 11. In the performance of the well logging duties, a coil 12 is supported by a hollow shaft 20 external to a logging sonde 13 suspended on a cable 14 from the earth's surface. Cable 14 encloses a plurality of electrical conductors connecting the control and signal presentation circuits 15 at the earth's surface with the switching mechanisms enclosed within the sonde 13 in the bore hole 10. The switching mechanisms within the sonde 13 and the control circuits 15 permit the coil 12 to be used for polarizing the earth formation 11, for compensating for the effects of extraneous remnant magnetic fields and for detecting the desired spin magnetic induction signals.

The switching mechanisms within the sonde 13 constitute a solenoid 16 having an operating shaft 17 provided with an insulated contact carrier 18 and a flange at 19. A spring 21 operates between the flange 19 and the body of the solenoid 16 to position the contact carrier 18 in the nonenergized position as shown in FIG. 1. Contact carrier 18 is provided at the ends thereof with a pair of contacts 22 and 23 connected by conductors 24 and 25, respectively, to the terminals (not shown) of the coil 12. Four stationary contacts 26, 27, 28 and 29 are provided for the solenoid 16 with the contacts 22 and 23 in engagement with contacts 26 and 27 in the normal unenergized position for the solenoid. The contact carrier 18 is adapted to carry the contacts 22 and 23 into engagement with contacts 28 and 29 upon energization of the solenoid 16.

Encased within the cable 14 are conductors 31, 32, 33, 34 and 35 carrying the energization and control for the logging sonde 13 in the downhole position from the control circuits 15 at the earth's surface. Conductors 31 and 35 are connected in the logging sonde to the contacts 26 and 27, respectively, and in the uphole components to a power source at battery 36. Conductor 35 is connected directly to one terminal of the battery 36, and conductor 31 is connected to the battery through a switch 37 and adjustable resistor 38. Conductor 34 is connected downhole to one terminal 29 of the solenoid 16 and uphole to a terminal of a second battery 39 through an adjustable resistor 41. In addition to being connected to battery 36, conductor 35 is also connected to a terminal of the battery 39 in the uphole components of the apparatus and, within the sonde 13, is connected by conductor 42 to terminal 28 of solenoid 16. Conductors 32 and 33 are connected to the solenoid 16 in the downhole components and, uphole, to a control circuit 43 including energization and switching circuits for the solenoid. The interconnection between the uphole and downhole components of the conductors 31 through 35 is provided by a slipring 45 on the cable drum 46 about which the cable is wound in raising and lowering the sonde 13 into the well bore 10.

In addition to the control circuitry just described, the uphole components of the apparatus illustrated in FIG. 1 also includes an amplifier 47, an oscilloscope 51 and a depth indicator 52. The amplifier is connected to the coil 12 through blocking capacitors 48 and 49 and the conductors 31 and 35, respectively. The oscilloscope 51 is driven by the amplifier 47 and may be either an electron gun type oscilloscope, as shown, or an oscillograph for producing a permanent record of its energization. The depth indicator is mechanically connected to a pulley 53 driven by the cable 14 as the logging sonde is raised and lowered within the well bore.

Referring now to the structure of coil 12 of the logging tool as shown in FIGS. 1 and 2 it may be seen that the coil 12 comprises a continuous coiling of conductors 61 into a rectangular configuration with terminal ends connected by conductors 24 and 25 to the identified power sources through the contacts of solenoid 16. The assembly of conductor 61 is encased by a nonmagnetic material 62 such as fiberglass or another similar material having desirable strength and flexibility characteristics and the entire coil 12 is surrounded by a nonmagnetic body 63 in cylindrical form so as to totally exclude the drilling fluids from contact with the coil and especially from the core area of the coil.

The entire cylindrical form of the body is coated with a protective cover 64 of a material having no magnetizable constituents and no magnetic moment. The coating 64 may be a substantially rigid material so that the body material 63 for the coil 12 may be a liquid enclosed within a container constituted by the coating 64.

The nonmagnetic characteristic of the material used to form the body 63 is an important feature of the polarizing coil 12. It has been found that an epoxy-resin is a satisfactory material for the body 63; however, this is merely an example of the materials that may be used and it should be understood that any of many available nonmagnetic materials may be used for the purpose of excluding the drilling fluid from the core of the coil.

FIG. 3 illustrates an alternative for the configuration of the polarizing coil 12 with the body 63a, as illustrated, assuming an elliptical form and the windings 61 a circular form.

FIG. 4 illustrates another form of apparatus for excluding the drilling fluids from the volume of the borehole wherein the well logging operation is to be performed. In the apparatus of FIG. 4 a logging sonde 13 is supported on cable 14 in a well bore 10 penetrating an earth formation 11. A coil 12 is supported externally to the sonde 13 on a shaft 20 and is encased within a flexible, expandable bag 71. The bag 71 is secured to a shoulder 72 on the sonde 13 by a suitable sealing ring 73 and, at the lower end of the coil 12, the bag 71 is sealed to a disk 74 supported on a shaft 75 carried by the coil 12. The seal at the disk 74 is accomplished by a suitable sealing ring 76 provided with an adjustment means at 77.

The interior of the sonde 13 is in communication with the interior of the bag 71 through a pipe 78 extending through the shoulder 72. A reservoir tank provided at 79 contains a flowable nonmagnetic material that may be forced into the expandable bag 71 by a reversible pump 81 with the pump operating to both expand and collapse the bag 71. A motor 82 is mechanically connected to the pump 81 to provide the necessary mechanical drive.

The uphole components of the apparatus as shown in FIG. 4 constitute the magnetization control circuits of block 83 including the energization control for the coil 12 and the control for solenoid 16 as illustrated in FIG. 1. A signal amplifier 47, oscilloscope 51 and depth indicator 52 are also provided for the apparatus of FIG. 4. In addition to the apparatus provided for the energization of the logging sonde of FIG. 1, the FIG. 4 apparatus also provides a control 84 for energization of motor 82 driving the pump 81. Interconnection between the uphole components and the downhole components is provided by conductors 85, 86, 87 and 88 connected through slipring 45 on spool 46 and through cable 14 to the downhole components of the logging tool.

The coil 12 of FIGS. 4 and 5 is the same as the coil 12 of FIGS. 1 and 2, with the exception of the provision in those figures of the body 63 and coating 64. The coil constitutes a plurality of conductors 61 enclosed in a non-magnetic casing 62.

As was explained in the preliminary remarks of this application, any inhomogeneity in the precession field employed in the spin magnetic induction well logging operation is at least partially created by the magnetizable material within the drilling fluids in the well bore of the earth formation being logged. The remnant field produced by the magnetizable materials after they have been magnetized upon the energization of the polarizing coil of the well logging tool persists to produce these inhomogeneities. The greatest source of the remnant field is logically produced by the material subjected to the highest magnetization flux, this being the material within the core of the polarizing coil. The apparatus of FIG. 1 reduces the remnant field by eliminating the drilling fluids from the core of the coil, and the apparatus of FIG. 4 accomplishes the same result by eliminating all drilling fluids from the borehole around the logging tool.

In the operation of the apparatus herein disclosed, and particularly with reference to the apparatus of FIG. 1, it may be seen that upon operation of the solenoid control 43 the solenoid 16 is energized to raise contacts 22 and 23 into contact with contacts 28 and 29, respectively, the coil 12 will then be connected to the battery 39 to effect polarization of the earth formation 11. Upon de-energization of the solenoid 16 the contacts 22 and 23 will be returned to engagement with contacts 26 and 27 at which time, if switch 37 is closed, coil 12 will be energized with a current flowing in the opposite direction to the current employed in the polarization of the formation. This reversed current will produce a flux to compensate for the remnant magnetic fields causing the inhomogeneities in the precession field for the polarized atomic particles producing the spin magnetic induction signals. Reference should be had to the aforementioned co-pending application of R. J. S. Brown, Serial No. 698,108, now Patent No. 2,999,204, wherein a fuller description is provided of the method of compensating the precession field for the inhomogeneities created therein by the extraneous remnant fields within the well bore and formation.

The improvement of the present invention substantially reduces the inhomogeneities in the precession field caused by the extraneous remnant fields by eliminating the largest cause of these extraneous remnant fields. The provision of a nonmagnetizable material in the core of the coil 12 understandably reduces the total flux of the polarizing field by providing a core path of lower permeability than that provided if the core were made of a magnetic material. This reduction in total flux is more than compensated for by the improved characteristic of the signals produced by the precessing atomic particles within the formations and, while a departure from what might be considered to be a logical design for the tool, the nonmagnetic core vastly improves the character of the spin magnetic induction signals over those produced by the aforementioned co-pending applications.

For the above purpose the body may be constructed of many materials such as pure benzene or carbon tetrachloride. Benzene or benzene diluted with carbon disulfide (which has no moments) has a long relaxation period and particularly so at the temperature encountered in logging operations where thermal relaxation times will be long. Carbon tetrachloride is a material that would give no spin magnetic induction signal (no hydrogen) although chlorine has a magnetic moment.

The operation of the apparatus as disclosed in FIG. 4 is, as far as the energization of the coil 12 and its operation in the reception of spin magnetic induction signals, the same as that defined for the apparatus of FIG. 1. The apparatus of FIG. 4 provides an alternative method for removing the source of extraneous remnant fields not only by eliminating the material within the core of the coil 12 but also by eliminating substantially all of the drilling fluids in the entire volume of the well bore in which the logging operation is being performed. In the apparatus of FIG. 4, the bag 71 is expandable to engage the side walls of the well bore 10 to exclude the drilling fluids from the volume wherein the tool is located. To accomplish this the reservoir tank 79 is adapted to carry a flowable material which may be forced into the bag 71 by the operation of the pump 81 to expand the bag as defined. Pump 81 is reversible so that the gases may be withdrawn from the bag 71 and returned to the reservoir tank 79 to at least partially collapse the bag. It is necessary that the bag be collapsible to permit movement of the tool within the well bore for logging the earth formations at various levels within the well.

It should be understood that the use of a gas including selected particles having gyromagnetic characteristics may also provide the test facility previously described with respect to the solid polarization coil core.

While certain preferred embodiments of the invention have been specifically disclosed, it is understood that the invention is not limited thereto as many variations will be readily apparent to those skilled in the art, and the invention is to be given its broadest possible interpretation within the terms of the following claims. It should be understood that where the term spin magnetic induction measurements is used it is intended to include electron magnetism measurements, nuclear magnetism measurements and measurements as above referred to as resonance and precession measurements.

I claim:

1. A well logging tool for identifying atoms by spin magnetic induction measurements including an apparatus having a polarizing coil and means for energizing said coil to polarize atomic particles of hydrogenous fluids contiguous to the side walls of said well, the improvement comprising an expandable bag enclosing said coil, a reservoir of flowable material connected to the interior portions of said bag, said flowable material within said reservoir having a spin magnetic induction characteristic requiring a substantially longer polarization period than the polarization period for said hydrogenous fluids contiguous to the side walls of said well, and means for transferring said material into said expandable bag to exclude drilling fluids within said well bore from at least the volume established by the dimensions of said coil, whereby said flowable material may be polarized and spin magnetic induction signals may be received from said flowable material only through employment of a polarization period substantially longer than the polarization period for said hydrogenous fluids.

2. A well logging tool for determining the presence of fluid materials within an earth formation by identifying atoms thereof through measurement of spin magnetic induction signals from said fluid materials within said formation, said tool being adapted to be lowered into a well bore penetrating said earth formation, and said well bore containing borehole fluids including drilling fluids and said earth formation fluid materials, the combination comprising an electromagnetic coil, a source of electrical power for energizing said coil to polarize particles having gyromagnetic characteristics within said fluid materials adjacent to said coil, a core for said coil for excluding borehole fluids from the interior core volume, said core being substantially coextensive in dimensions with said coil in a plane parallel to the axis of said well bore and having a cross section configuration for totally enclosing said coil, said coil being constructed of a material including particles having a gyromagnetic characteristic requiring a substantially longer polarization period than the polarization period for earth formation fluid materials and said borehole fluids whereby spin magnetic induction signals may be detected from said core material only through extended polarization longer than normal for said fluid materials within said earth formation and said well bore.

References Cited in the file of this patent

UNITED STATES PATENTS

| Re. 23,769 | Varian | Jan. 12, 1954 |
| 2,167,630 | Brazzoni et al. | Aug. 1, 1939 |
| 2,669,689 | Doll | Feb. 16, 1954 |
| 2,756,383 | Nold et al. | July 24, 1956 |

FOREIGN PATENTS

| 745,873 | Great Britain | Mar. 7, 1956 |
| 1,015,954 | Germany | Sept. 19, 1957 |

OTHER REFERENCES

Waters et al.: Geophysical Prospecting, vol. 4, No. 1, pp. 1–9, March 1956.

Arnold: Physical Review, vol. 102, No. 1, Apr. 1, 1956 (pp. 140–141 relied on).

UNITED STATES PATENT OFFICE

CERTIFICATE OF CORRECTION

Patent No. 3,042,855                                           July 3, 1962

Robert J. S. Brown

It is hereby certified that error appears in the above numbered patent requiring correction and that the said Letters Patent should read as corrected below.

Column 3, line 9, for "improveemnt" read -- improvement --; line 65, for "in homogeneous" read -- inhomogeneous --.

Signed and sealed this 8th day of January 1963.

(SEAL)
Attest:

ERNEST W. SWIDER
Attesting Officer

DAVID L. LADD
Commissioner of Patents